(12) United States Patent
Sommer

(10) Patent No.: US 9,276,974 B2
(45) Date of Patent: *Mar. 1, 2016

(54) TOPICAL ACTIVITY MONITOR AND IDENTITY COLLECTOR SYSTEM AND METHOD

(71) Applicant: Matthew S. Sommer, Plano, TX (US)

(72) Inventor: Matthew S. Sommer, Plano, TX (US)

(73) Assignee: MarketChorus, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 14/186,192

(22) Filed: Feb. 21, 2014

(65) Prior Publication Data

US 2014/0172837 A1    Jun. 19, 2014

Related U.S. Application Data

(63) Continuation-in-part of application No. 13/648,588, filed on Oct. 10, 2012, now Pat. No. 8,930,384.

(60) Provisional application No. 61/546,211, filed on Oct. 12, 2011.

(51) Int. Cl.
*G06F 7/00* (2006.01)
*G06F 17/30* (2006.01)
*H04L 29/06* (2006.01)
*G06Q 50/00* (2012.01)

(52) U.S. Cl.
CPC ........ *H04L 65/403* (2013.01); *G06F 17/30864* (2013.01); *G06F 17/30979* (2013.01); *G06Q 50/01* (2013.01)

(58) Field of Classification Search
None
See application file for complete search history.

(56) References Cited

U.S. PATENT DOCUMENTS

2009/0276715 A1* 11/2009 Arbogast et al. .............. 715/736

2010/0235481 A1* 9/2010 Deutsch et al. ............... 709/222

FOREIGN PATENT DOCUMENTS

EP    1 294 127 A1 *    3/2003    .............. H04L 12/24

*Primary Examiner* — Uyen Le
(74) *Attorney, Agent, or Firm* — The Law Firm of H. Dale Langley, Jr., P.C.

(57) ABSTRACT

A method for identifying respective networked devices in a social communications network, which networked devices communicate messages relevant to an article. The messages may include posts, shares, likes, votes, ranks, and other comments. A server of the social communications network maintains a respective identity (e.g., user name or handle) for each connected networked device, respectively, of the social communications network. The server includes an API for requests. The method includes receiving a search item from a data communications network, collecting articles related to the search item from each of the at least one source of articles of the data communications network, storing in a database, for each respective one of the article from the step of collecting, a respective unique identifier representing the article, comparing the search item to each respective unique identifier, respectively, of the database, to determine similarity of the respective unique identifier to the search item, compiling a result set of each respective unique identifier determined similar to the search item in the step of comparing, communicatively detecting the share count of the messages of the social communications network related to the result set, deriving a score based collectively on all of the share counts from the step of communicatively detecting, the score represents topical activity of networked devices of the social communications network for the search item, calling the API of the server intermediating communications among the networked devices of the social communications network, receiving the identities of the networked devices of the social communications network; and storing the identities in a database in a storage.

3 Claims, 10 Drawing Sheets

TOPICAL ACTIVITY MONITOR AND IDENTITY COLLECTOR SYSTEM AND METHOD

CROSS-REFERENCE TO RELATED APPLICATIONS

The present application is a continuation-in-part and has benefit of priority of U.S. patent application Ser. No. 13/648,588, titled "Topical Activity Monitor System and Method," filed Oct. 10, 2012 (a conversion of U.S. Provisional Patent Application No. 61/546,211, filed Oct. 12, 2011), which prior patent application is co-pending and has at least one same inventor of the present application, and which issued on Jan. 6, 2015 as U.S. Pat. No. 8,930,384.

TECHNICAL FIELD

The invention generally relates to identification in computer network systems, and more particularly relates to identification in the computer network systems based on network activity related to topics of articles and items published for access via the computer network systems.

BACKGROUND

Articles, advertisements, software, files, apps, and other information and content items are often published (i.e., made accessible to others) on a computer network for access by users of computers communicatively connected to the network. User access or interaction with a respective article has at times been monitored to measure indications of user activity and interest in the item. User activity and interest as to any particular individual item has typically been monitored and measured only as to the specific, individual item.

Certain analytics applications, such as web analytics, have collected data related to a particular website or website feature. As an example, Google™ Analytics has provided summarized "dashboard" metrics profiling use of a particular website searchable through the Google™ Internet directory search service, including summarized metrics such as website visits, bounce rate, average time on site, referring or direct hits, and similar information regarding a particular website of the service. Other web analytics providers, such as Facebook™ Insights, have made available summarized metrics profiling a particular social network "Page" of the service, including summarized metrics such as numbers of posts to the Page, total "Likes" by others relating to Page contents, and numbers of posters for content associated with the Page contents. Other publicly available and private sources make available similar and other types of summarized metrics, for individual websites, pages, blogs, and the like.

Though conventional analytics have provided various website, website page and website feature metrics, the conventional analytics do not directly provide insight into particular topical contents or subjects of the websites, pages, or features. Of course, topical content may be contained or addressed in any website, page, blog or the like, such as in articles, links, software programs, advertisements, social media text, and others. Because conventional analytics and schemes have been directed to visit and traffic measurement of individual websites and pages, measurement of the popularity and attention to an idea, theme, or topic related to a shared or published object or item has not been possible. Such measurements of popularity and attention to an idea, theme or topic, however, would significantly benefit businesses and persons interested in more holistic measure of topical awareness/interest (as opposed to the conventional analytics focus on measures associated only with visits, traffic types or location, and similar individualized aspects for an individual website, page or similar item).

The summarized metrics available from conventional analytics provide overview measurement of the activity in the computer network system. Identification of the individual actors (e.g., the communication devices and users of those devices) contributing to activity in the computer network system may be available from the system. The social networking site Twitter™, for example, provides an application programming interface (API) call that can return identifications of the individual actors in the social network system. The individual actors can be identified, for example, by username or user handle associated with the communications device and corresponding to its user. Although identification of individual actors is possible, the identification, itself, has not had relevance to particular ideas, themes and topics relevant to those individual actors.

It would, therefore, be a significant improvement in the art and technology to provide for topical activity monitoring for measure of user activity and interest in particular topic or category of articles generally, and for targeting particular identities corresponding devices communicatively contributing to topical activity in a computer network system.

SUMMARY

Embodiments of the invention include systems and methods for monitoring topical interest or activity in or with respect to a search item, such as a word, text, image, or other. Embodiments access and process share counts of messages (e.g., posts, shares, likes, votes, ranks, and other comments, and combinations) in social/online networks regarding articles related to the search item. A score is processed, providing a measure of interest or activity in the articles, as a relative measure of interest or activity for the search item.

Embodiments of the invention include systems and methods for collecting identities of networked devices communicating in a social/online network regarding an article relevant to a search item. The identities may include the user name or handle of the networked device of the social/online network. A call is made to an API of a server of the social/online network, requesting the identities. The identities are collected and stored in storage.

An embodiment of the invention includes a method of collecting identities of networked devices communicating in a social communications network regarding a topical item. The method includes calling an application programming interface (API) of a server intermediating communications among the networked devices, receiving the identities of the networked devices in the social communications network, and storing the identities in a storage.

Another embodiment of the invention is a system for collecting identities of networked devices communicating in a social communications network regarding an article, in which a server mediates communications in the social communications network, and the server includes an application programming interface (API). The system includes a processor, data storage communicatively connected to the processor, a call device communicatively connected to the processor for communicating with the API of the server to request the identities, a receive device communicatively connected to the processor for capturing the identities in response to the request, and a data handler communicatively connected to the processor and the data storage, for indexing the identities relative to the article in the data storage.

Yet another embodiment of the invention is a method of monitoring topical activity and collecting identities of networked devices of a social communications network. The social communications network communicates related messages between networked devices and maintains a share count of the related messages. A data communications network includes at least one source of articles. A respective unique identity of each of the networked devices is maintained by a server having an API and intermediating communications among the networked devices. The method includes receiving a search item from a data communications network, collecting articles related to the search item from each of the at least one source of articles of the data communications network, storing in a database, for each respective one of the article from the step of collecting, a respective unique identifier representing the article, comparing the search item to each respective unique identifier, respectively, of the database, to determine similarity of the respective unique identifier to the search item, compiling a result set of each respective unique identifier determined similar to the search item in the step of comparing, communicatively detecting the share count of the messages of the social communications network related to the result set, deriving a score based collectively on all of the share counts from the step of communicatively detecting, the score represents topical activity of networked devices of the social communications network for the search item, calling the API of the server intermediating communications among the networked devices of the social communications network, receiving the identities of the networked devices of the social communications network, and storing the identities in a database in a storage.

Another embodiment of the invention is a system for monitoring topical activity in a search item of a user device and collecting an identity of the user device. Messages including an article artifact representing an article are communicated over a communications network of networked devices. The communications network counts the messages to yield a share count of the messages for the communications network. A server mediates communications in the communications network. The user device has a unique identity in the communications network maintained by the server. The system includes a query receiver communicatively connected to the user device, for communicatively receiving the search item from the user device, a database communicatively connected to the query engine, the database contains at least one indexed article representing the article, a comparator communicatively connected to the query device and the database for determining any of the at least one indexed article of the database similar to the search item received by the query receiver, a detector communicatively connected to the comparator and the communications network, for accessing the communications network to obtain, for each of the at least one indexed article determined by the comparator, the share count of the messages of the communications network including the article artifact representing the indexed article of the article, a score processor communicatively connected to the detector, for deriving a score from the share count of the messages, the score represents topical interest in the search item for the communications network, a processor communicatively connected to the comparator for receiving an indicator that at least one indexed article of the database is similar to the search item, data storage communicatively connected to the processor, a call device communicatively connected to the processor for communicating with the API of the server to request the identity of the user device from the server, a receive device communicatively connected to the processor for capturing the identity of the user device returned by the server, and a data handler communicatively connected to the processor and the data storage, for indexing the identity relative to the search item in the data storage.

Yet another embodiment of the invention is a method of monitoring topical activity among respective networked devices of each of a plurality of respective social communications networks. Each respective social communications network communicates respective related messages between the respective networked devices of the respective social communications network and maintains a respective share count of the respective related messages of the respective social communications network. A data communications network includes at least one source of articles. A respective unique identity of each of the networked devices is maintained by a respective server of the respective social communications network. The respective server has a respective API and intermediates communications among the respective networked devices of the respective social communications network. The method includes receiving a search item from a data communications network, collecting articles related to the search item from each of the at least one source of articles of the data communications network, storing in a database, for each respective one of the article from the step of collecting, a respective unique identifier representing the article, comparing the search item to each respective unique identifier, respectively, of the database, to determine similarity of the respective unique identifier to the search item, compiling a result set of each respective unique identifier determined similar to the search item in the step of comparing, communicatively detecting the respective share count of the respective related messages of each one of the plurality of respective social communications network related to the result set, deriving a score based collectively on all of the respective share counts from the step of communicatively detecting, the score represents topical activity of all of the respective networked devices of all of the plurality of respective social communications networks for the search item, calling the respective API of the respective server intermediating communications among the respective networked devices of the respective social communications network, for each of the respective social communications network, receiving the respective identities of the respective networked devices of the respective social communications network, for each of the respective social communications network, and storing the respective identities for each of the respective social communications network, in a database in a storage.

BRIEF DESCRIPTION OF THE DRAWINGS

The present invention is illustrated by way of example and not limitation in the accompanying figures, in which like references indicate similar elements, and in which.

DETAILED DESCRIPTION

Figure 1:
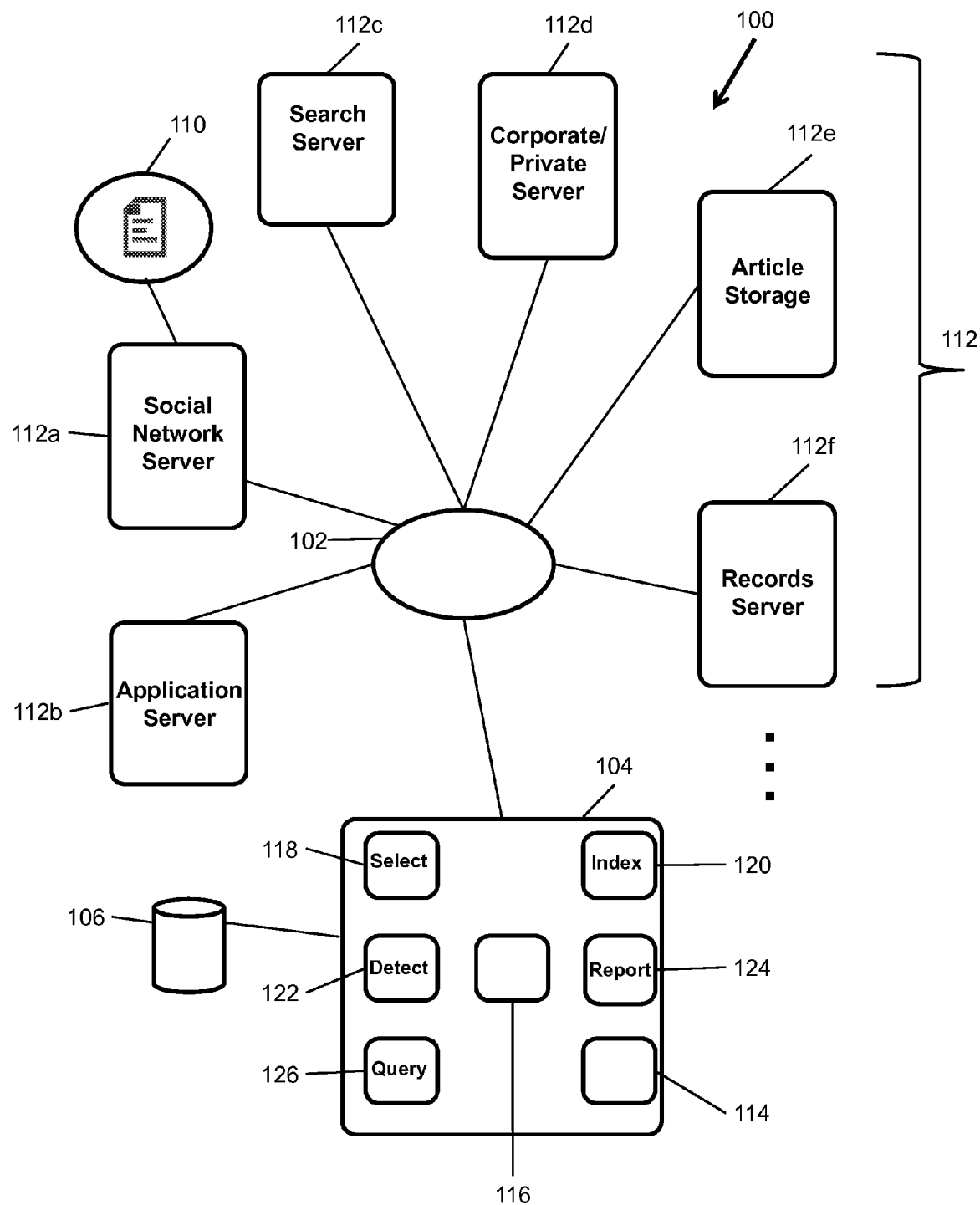
FIG. 1 illustrates a system for monitoring topical activity represented interactivity of network connected devices with articles of source devices of the network, according to certain embodiments of the invention.

According to certain embodiments, in a computer network system, articles (which include, but are not limited to, documents, advertisements, software, social media text and other information content, and other items, each having one or more subject or topic, are available for access by computers communicatively connected to the network system). These articles are hosted or accessible on websites, servers, or other host devices of the network, for access by other devices communicatively connected to the network. The articles may be identified as having a particular topic or category. For example, an article that is a press release may relate to a particular company or event of that company; an article that is a social media post may relate to a particular company's stock or a consumer item (e.g., coffee, movie, etc.); an article that is software may be an application program (e.g., what is commonly known as an "app") or other program or file representing an action processed by a microprocessor device to obtain a result; an article that is an advertisement may relate to any of a wide variety of consumer, business or other products or services offered; and numerous other examples of articles are possible. An article can also be a link to another article, such as a hyperlink or location or other link (e.g., a social media "like" or "share" of a web pointer to a content or other information or item). These various articles are "published" (e.g., broadly including, but not limited to, uploaded, stored, pushed, or otherwise provided or delivered or made accessible over the network) by a source device communicatively connected to the network, for access by other devices communicatively connected to the network through network communications between the source and other devices.

Each article references or represents one or more particular topical item. According to embodiments, a monitor detects the one or more particular topical item for an article that is published. The monitor is, for example, a computer communicatively connected to the network that identifies that the article is published (i.e., made accessible to devices of the network) by a publisher device communicatively connected to the network. The monitor, or in certain alternatives, devices in communicative connection with the monitor, parses the article to determine the one or more particular topical item of the article.

The one or more particular topical item of the article (as so determined by the monitor) is employed by a search engine of or communicatively connected to the monitor, to detect any additional articles published by the same or another publisher device of the network, which additional articles have same or relative relationship to the one or more topical items. An activity detector is communicatively connected to the monitor and the search engine. The monitor and the search engine signal to the activity detector an identifier of all articles of the one or more topical item. The activity detector, via communicative connection to the network, detects devices and interactions of those devices with the articles over the network. Application programming interfaces (APIs) of the communication networks, of devices communicatively connected to the network, and/or of elements providing communication connectivity in and among the networks, are interfacingly accessed by the activity detector communicative to detect the devices and interactions of devices.

An output device is communicatively connected to the activity detector. The output device collects and processes detected device and interaction indicia from the activity detector and performs metrics analyses of the indicia. In certain embodiments, the output device displays or otherwise reports the analyses and other relevant characteristics of the indicia, such as one or more measurement level.

Generally, embodiments employ online content that has relevance, similarity or some other relationship to a particular topic, such as of an article, to obtain a measure of overall awareness of the topic (as determined by interaction of users, via networked user devices, with articles relevant to the topic). This overall awareness of each particular topic is gauged by measuring activity relevant to articles corresponding to the topic on one or many communications networks, for example, the Internet (generally), social networks of interconnected communications devices, corporate or enterprise networks, and other similar communicative networks of communications devices operated by respective device users.

Access, viewing, downloading, operating/processing, and other interaction with web based content, for example, is a proxy to public awareness measures regarding topics of the content. Sharing/Liking/Interactions via social/online communities of communicatively connected devices, and users of the devices, of content the same or similar to a particular topic is determined and included in measures by the embodiments to provide assessment of public awareness of the particular topic.

Further according to certain embodiments, actor communications devices communicating in a computer network system regarding a particular topic are identified. These actor communications devices are identified, for example, by unique user name or handle in the network system. Identifiers of the devices are collected from the computer network system and saved in a database in relation to the particular topic.

Referring to FIG. 1, a system 100 for monitoring topical activity represented by an article 110 (or item representing or referring to the article, also referred to at times as the article 110 for purpose of FIG. 1) accessible in a communications network 102, includes a monitor processing device 104 having or communicatively connected to a database 106. As used in this disclosure, the term "article" comprises a digital artifact of the network 102 or of a device or element of or communicatively connected to the network 102, which is usually processable or producible (e.g., displayed, edited, output) by a device communicatively connected to the network 102, and includes but is not limited to any of file, document, advertisement, software program, app, picture, graphic, object, or content item capable of being digitally represented in a storage, computer, or communicated signal of or communicatively connected to the network 102 or available for access by computers or devices connected to the network 102. Certain nonexclusive examples of such an article include a press release related to a particular company, or event, product or service of the company; a publication that is a company website or social media website post related to a particular company's stock or a consumer item (e.g., coffee, movie, or another product or service); a software program, script, code or other program or file available from or interactive with a website or computer connected to the network 102, representing an action processable by a microprocessor device to obtain a result (e.g., including, without limitation, what is commonly known as an "app"); advertisement for any of a wide variety of consumer, business or other products or services offered or other notice or announcement, available from the network 102 as pop-up, push, download or in any other manner; and numerous other examples of articles obtainable via communicative connection to the network 102 are possible (e.g., flash programs, cookies, website statistics, and others). Additionally, in other nonexclusive examples, an article can be or include a link to another distinct or related article, such as a hyperlink, identifier, or locator, or a location or other link or referral source (e.g., a social media "like" or "share" of a web pointer to a content, information or other item). These various articles are "published" (e.g., broadly including, but not limited to, uploaded, stored, pushed, or otherwise provided or delivered or made accessible via communications over the network 102) by one or more source device communicatively connected to the network 102, for access by another device communicatively connected to the network 102.

As nonexclusive examples, source devices 112 communicatively connected to the network 102 may include, but are not limited to, one or more of a social network server 112a, an application server 112b, a search server 112c, a corporate/private server 112d, an article storage 112e, a records server 112f, other processing and/or communication devices, and any combination of these. The social network server 112a is any device communicatively connected to other devices of users with similar interests in any article (e.g., Facebook™, Google+™, LinkedIn™, and others), for example, via a website of the server 112a. The application server 112b is any device communicatively connected to other devices for access by the other devices to any article of software services of the server 112b. The search server 112c is any device communicatively connected to other devices for access to an Internet directory search service of the server 112c for any article. The corporate/private server 112d is any device communicatively connected to other devices for access to a website, download site or page (e.g., ftp, Rich Site Summary (RSS) feed, link or other), or other programming interface of the server 112d that is, includes or makes available for access any article. The article storage 112e is any memory, or non-transient store of data in memory, for or representing any article, and communicatively connected to other devices. The records server 112f is any device through which any memory or non-transient store of articles or references (including links) in memory, communicatively connects to other devices. For purposes of this disclosure, all source devices 112 (including but not limited to the servers 112a-d and f and the storage 112e) may at times be referred to individually and collectively as such, and at other times each of the social network server 112a, the application server 112b, the search server 112c, the corporate/private server 112d, the article storage 112e, or the records server 112f may be more specifically referenced for purposes of explanation. The source devices 112, and each of them, have similar characteristic in that each is a device communicatively connected to the network 102 as a publisher of or source (including referral) for access by other devices to one or more article.

The network 102 can be or include any telecommunication and/or data network or combination of such networks, whether public, private or combinations of these, including, for example, the Internet, a local area network, wide area network, intranet, public switched telephone network (PSTN), wireless (e.g., cellular, WiFi, WLAN, GPS, infrared, satellite, radio frequency, or other) network, satellite network, other wired or wireless communication link or channel, combination of links or channels, or any combination of these. A non-exclusive example of the communications network 102 is the Internet, including but not limited to any and every possible combination of a wired data link, wireless cellular data link, and other link connected to the Internet (e.g., connected directly or indirectly connected through other links or networks). Pluralities of different ones and types of the source devices 112 are contemplated, where each source device 112 communicatively connects to the network 102 for communicative access by or via the monitoring processing device 104, or element(s) thereof.

Figure 2:
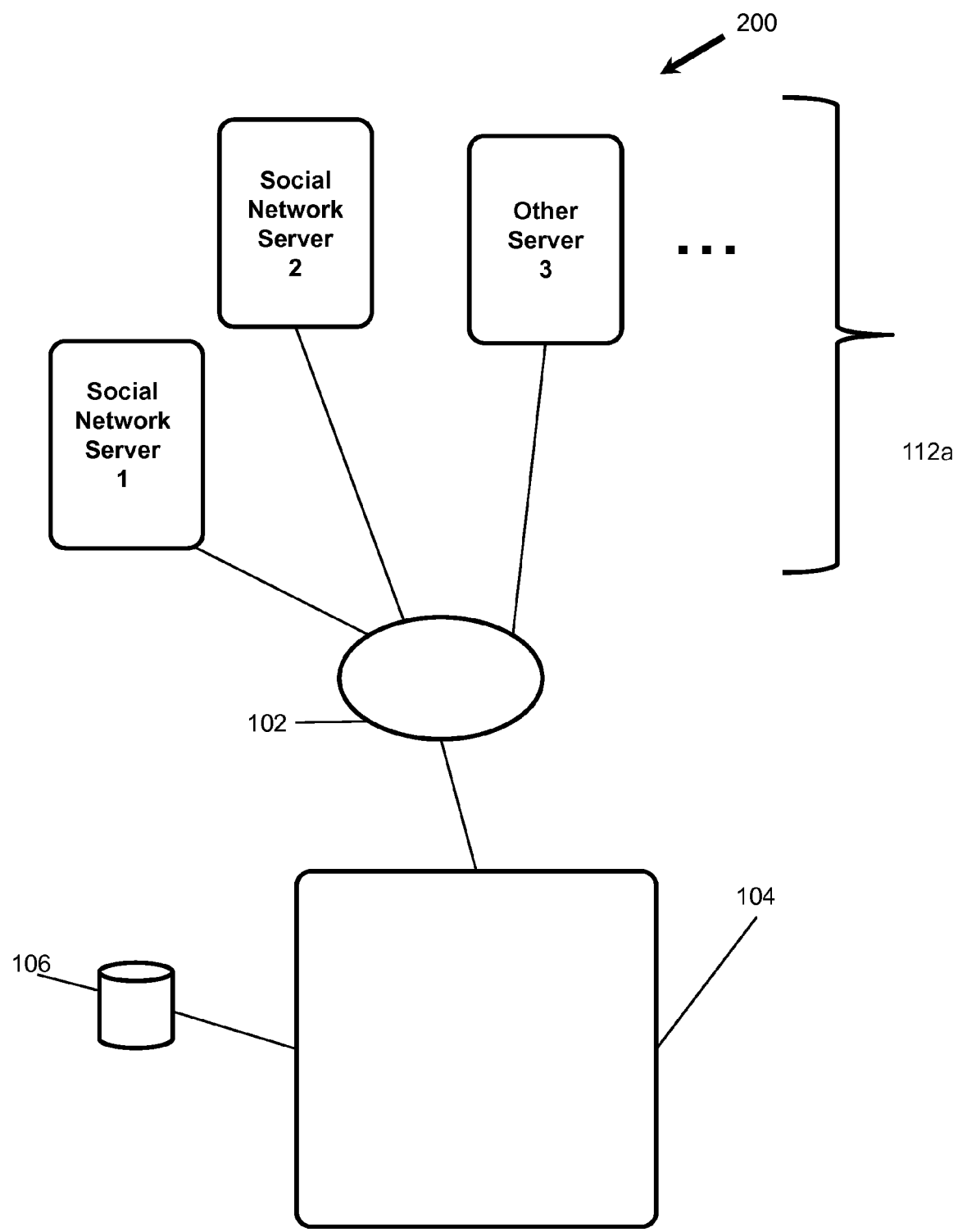
FIG. 2 illustrates a system for detecting article interactions by network connected devices of a social/online network system, according to certain embodiments of the invention.

Referring to FIG. 2, in conjunction with FIG. 1, the monitor processing device 104 of the system 100 includes or communicatively connects to a processor 114 and memory 116. The monitor processing device 104 also includes or communicatively connects to a collector 118, an indexer 120, an activity detector 122, a query engine 126, and a reporter 124. The collector 118 is or includes one or more hardware device, software program stored in memory, or combination of these, of or communicatively connected to any one or more of a website, computer interface device, signal sampler device or sniffer, RSS feed source, or another source device 112, of or communicatively connected to the network 102. The collector 118 continuously, intermittently, or responsive to input, as applicable in the embodiment, searches and discovers articles available for access over the network 102 from the source device 112. The collector 118 may additionally, but need not necessarily (e.g., where another device or human intervention may be instead involved), parse the articles for particular one or more topical item of each articles.

The indexer 120 is or includes one or more hardware device, software program stored in memory, or combination of these, communicatively connected to the database 106 or similar storage, and capable of processing indicia, including topical item(s), parsed from the article. The indexer 120, based on the one or more topical item of each article as determined from parse of the article, designates a unique identifier for the article (for example, a number or numbers, letter or letters, other identifiers, metatag or tags, or combinations, as desired in the embodiment), and stores the identifier and additional indicia of the article. Indicia of the article can include, for example, any of a topical item, title, source or publisher, publication time, author, summary, tag(s), image list, revision time, other label or element representing the article, or combination. These indicia are stored by the collector 118 in the database 106 or similar storage, for access via the unique identifier and/or via the corresponding indicia of the article.

The query engine 126 is or includes one or more hardware device, software program stored in memory, or combination of these, communicatively connected to the processor 114 and memory 116. The query engine 126 includes a website display of a search input request template (not shown in detail in FIG. 1). The website display is served to a device communicatively connected to the network 102, such as via the monitor processing device 120 or a website server communicatively connected to the device 120. For example, a website program is processed by the device 120 or a connected website server and, on request over the network 102 from a computer or processing device of the network 102, the device 120 or server, as applicable, processes the website program and communicates the website display over the network 102 for receipt, processing and display by the requesting computer or device in a browser. The search template communicatively interfaces to the query engine 126 for input of a search request, via communication over the network 102, for a select one or more article indexed and stored by the indexer 120.

Search requests that may be input to the query engine 126 via the website display may be or include any article or portion of an article, word, number, text, programmed filter criteria of the website display, and combinations. For example, an article paragraph, title, source, time since publication, publication date, hyperlink to article or link for article, website identifier or locator (e.g., URL), portion or combination of these, or other criteria, is input to a block or form of the search template of the website display and the input is communicated over the network 102 to the query engine 126. On receiving input (sometimes referred to as "search item"), the query engine 126 processes the input, including by comparing for level of relevancy of the input received by the query engine 126 to indicia of articles which have been indexed and stored by the collector 118 in the database 106 or similar storage.

Input received by the query engine 126 is measured for relevancy to indicia of articles by one or more relevancy measures. A non-exclusive example of possible relevancy measures includes a semantic measure in which statistical processing determines a similarity of words of the input to the indicia of articles (e.g., word or keyword match(es)). Other non-exclusive examples of relevancy measures include more sophisticated document clustering techniques, Boolean expression comparison, natural language process, latent semantic analysis, statistical and probabilistic comparisons, as well as publication source comparison, comparison of publication or other temporal aspects, popularity or rating measures of others (e.g., starred or preferred selections), financial or other proxy information relativity, and others. If relevancy measure(s) for an indexed article (or indicia of the article) meet or exceed a threshold, such as a programmed level or variable, the query engine 126 determines that the article is relevant for purposes of the particular request received by the query engine 126 from the network 102. The one or more article (as represented in the database 106 or other storage) so determined by the query engine 126 to be relevant, are assembled as a result set.

The result set of article(s) is accessed by the activity detector 122. The activity detector 122 is or includes one or more hardware device, software program stored in memory, or combination of these, as well as a processor and memory, for example, the processor 114 and memory 116. The activity detector 122 is communicatively connected to the network 102 for communicating with at least one count device, for example, the social network server 112a, of a social/online network provider for communicatively connected network devices. For convenience of explanation, all count device(s), and all or portions of them, are illustrated in FIGS. 1 and 2 as the social network server(s) 112a. However, any one or more count device (e.g., one or pluralities of different social/online network provider servers) are possible in the embodiments, and each count device may be distinct, in whole or part, from others of the count devices. For example, the social network server 112a, i.e., a count device, can be a server or other computer or network system of any of a wide variety of social/online network providers, such as Facebook™, Google+™, LinkedIn™, Digg™, Pinterest™, Delicious™ Reddit™, and others, and pluralities of these social network servers 112a of the respective social/online network providers are included in the embodiments. Each social network server 112a includes or communicatively connects to a programmed interface or query system, for example, allowing communicative access over the network 102 via a respective web page or link of the servers 112a. The interface or query system, such as a respective web page or link, for each respective social network server 112a is herein referred to as an "API" of the particular social/online network of the server 112a.

Each social network server 112a maintains a collected count ("share count") representing the number of user devices of a social network or similar computer or communication network that have shared, posted, liked, voted on, or otherwise interacted with or in respect of (also refererred to as "messages", referring to any related interactions of devices of the network) particular URL(s) of a web page or pages accessible over the network 102. The share count is or includes measures/ratings/counts accessible by the activity detector 122 from each respective server 112a operating as count device, through communications of the activity detector 122 with the API for the server 112a over the network 102. A nonexclusive example of one type of the share count includes the measures available by communicative access over the network 102 to Facebook™ at an API of its server 112a (and similarly for other social/online network servers). The activity detector 122, communicating over the network 102, inputs a desired query or data to a web page or link API of the server 112a of the social/online network. The server 112a communicatively responds to the activity detector 122 over the network 102, such response being one or more measure (i.e., share count) for the particular URL and particular social/online network. The activity detector 122 continues polling additional ones of the servers 112a of other social/online networks, via respective API of the applicable servers 112a, to collect similar measures (i.e., share counts) from each of the other servers 112a, for the same URL. The activity detector 122 further collects similar measures (i.e., share counts) in this manner from the various servers 112a of all of the social/online networks, for all other URLs of the result set. In certain embodiments, additional types of share count, such as shares, posts, likes, voted on, or otherwise (i.e., messages that are related), are additionally or alternately collected by the activity detector 122 from same or different servers 112a, either in conjunction with the foregoing or in separate similar communicative operations between the activity detector 122 and the various servers 112a of the social/online networks.

As a more specific example of operation of the activity detector 122 regarding the Facebook™ social/online network, a URL of an article representing or corresponding to the iPhone 5 is included or represented in the result set from the query engine 126. The URL is, for example, http://www.huffingtonpost.com/neil-katz/iphone5-apple-best-selling-gadget_b__1884724.html. On receiving the URL of the result set, the activity detector 122 communicatively inputs the URL over the network 102 to the Facebook™ API of the applicable network server 112a. The Facebook API is, for example, accessed by the activity detector 122 from the server 112a at the link http://graph.facebook.com/http://www.huffingtonpost.com/neil-katz/iphone5-apple-best-selling-gadget_b_1884724.html. The server 112a, via the API, responsively communicates the measure over the network 102 to the activity detector 122, for example, the response is a structured JavaScript Object Notation (JSON) response such as:

```
{ "id":
"http://www.huffingtonpost.com/neil-katz/iphone5-apple-best-selling-
gadget_b_1884724.html",
"shares": 3777 }.
```

On receiving this response, the activity detector 122 determines that the URL (and, consequently, the article of the URL) had been "shared" a total of 3777 times on the Facebook™ social/online network at the time of the response. The activity detector 122 continues polling others of the servers 112a, for example, of the social/online networks of Google™, LinkedIn™, Digg™, Pinterest™, Delicious™, Reddit™, and others, to collect similar share counts from other servers 112a for each respective social/online network, for the same URL and for other URLs of the result set. Additional types of share count, such as posts, likes, voted on, or otherwise, are additionally or alternately collected by the activity detector 122 in similar manner.

In embodiments, a share count can represent any number of types of social network interaction measures of a social/online network, and these may be similarly or differently named by each respective social/online network (e.g., one such network may refer to a measured interaction as "liked", and referred to by another such network as "recommended," "rated," "voted on," etc.; and related messages are related by the network based on any of a wide variety of article artifacts, according to the network, common for the related messages (e.g., same, similar or related subject matter of the messages, threads of the messages, or otherwise)). In the case of each social/online network, an API of the network is accessed by the activity detector 122 for communicative input of URLs of the result set from the query engine 126. The social/online network, via its corresponding server 112a of the API, communicates the share count representing the interaction measure back to the activity detector 122.

Also in embodiments, the activity detector 122 can collect share counts at various points/times during operations of the activity detector 122, as desired for such operations. Share counts may be collected by the activity detector 122 at a point that an initial (or first) search request is input to the query engine 126. On input of the search request, the query engine 126 determines a result set of articles then indexed and corresponding to the request. The result set of article(s) is accessed by the activity detector 122, and the activity detector 122 commences communicating with respective API's of servers 112a of applicable social/online networks to determine share counts in respect of the result set of articles. Additionally, one each next search request resulting in any result set of any same article, the activity detector 122 again communicates with respective API's of servers 112a of applicable social/online networks to determine share counts for the particular same article represented by the result set (as well as other articles represented by the result set). A running history of share counts collected by the activity detector 122 for each indexed article is maintained, for example, in the database 106 or other storage of or communicatively connected to the monitor processing device 104. In the event that the activity detector 122 cannot communicatively connect to a server 112a of any particular social/online network at the time the query engine 126 receives input of a search request, the historical share count for the article and particular social/online network is available for reporting and further processing by the monitor processing device 104. The historical share counts for the indexed articles are also available for analyzing changes in the rate of share counts and other statistics processed for reporting and other analysis by the monitor processing device 104, such as, for example, for incorporation in processing of an overall awareness score and others.

In certain alternatives, the server(s) 112a of a social/online network or networks can be directly accessed by the activity detector 122, for example, through proprietary API, communicative connection separate from or included as subpart of the network 102, or other link or connection between the activity detector 122 and the applicable server 112a. In other alternatives, activity detector 122 can communicatively obtain share counts and the like from an aggregator device, such as a third party provider or data reseller server (e.g., Gnip.com or other), for social/online networks, or similar arrangement. In further alternatives, the activity detector 122 includes or communicatively connects to a device (not shown in FIG. 1) that indexes, summarizes, collects and/or stores social network posts from a social/online network server computer or device, and the device is polled by the activity detector 122 to obtain share counts.

The collection of share counts obtained by the activity detector 122 (responsive to a search request to the query engine 126 and applicable result set of then-indexed articles of the database 106), is accessed by the reporter 124. The reporter 124 is or includes one or more hardware device, software program stored in memory, or combination of these, as well as a processor and memory, for example, the processor 114 and memory 116. The reporter 124 is communicatively connected to the network 102 for communicating with user device(s) submitting search requests over the network 102. For example, each user device is, includes or communicatively connects to a computer, laptop, tablet, smart phone, or other device communicatively connected to the network 102, and capable of communicating the search request to the query engine 126 over the network 102.

The reporter 124, using the share counts collected by the activity detector 122 corresponding to a search request received by the query engine 126 as input, determines an overall score for the search request. The overall score (also referred to as "Resonance score") represents a level of "awareness" for the particular topic of the search for which the search request is made. More particularly, the Resonance score represents the volume of articles and corresponding share counts for those articles for the search request. A higher Resonance score (e.g., a relatively high volume of articles and high share counts for those articles) indicates a higher interest or awareness of the topic of the search request, and a lower Resonance score (e.g., a relatively lower volume of articles and lower share counts for those articles) indicates a lower interest or awareness of the topic of the search request.

The reporter 124 computes the Resonance score from input of all share counts collected by the activity detector 122 for the article(s) 110 of the result set of the query engine 126 (i.e., for the particular search request) and programmed or designated bias benchmark. A nonexclusive example of the computation includes a weighted average result, in which the respective share count for each article 110 is multiplied by the bias benchmark for the either the article 110, the share count, or combination of these; the results of the multiplication for each share count are summed; and the resulting sum is divided by the total number of all share counts for all article(s) 110 of the result set. The weighted average result (having a percentage value) is mapped by the reporter 124 to a scale of 1-100 as the Resonance score (e.g., if the weighted average result is 75%, the Resonance score from mapping to the scale may be 75). The bias benchmark for each article 110 and/or respective share counts for article 110 can be related to the degree or extent of relevance or similarity of the article 110 and/or its share counts to the subject of the search request received by the query engine 126. Alternately or additionally, benchmarks (or respective ones of them) can be or include weightings or other indicators of article source, relative age or date of publication or the like, overall share count in general (e.g., log(x) value of totals), and/or other intrinsic or temporal factors or aspects of the respective article(s), the search request at issue, or others. In addition to or in the alternative, the reporter 124 may, but need not necessarily in all embodiments, determine scores or measures for the search request which are in addition to the Resonance score.

The reporter 124 compiles and formats the Resonance score (and, if applicable other scores or measures) together in a report template. The report template can additionally include other items, such as items representing history of share counts, Resonance scores, and others, but need not necessarily do so in certain embodiments. The reporter 124 delivers or makes available for access the report template containing the Resonance score, for example, the report template is accessible to requesting computer or device of the search request from a website, download site or link, data service or otherwise. In certain embodiments, a website viewable through communication over the network 102 in a browser of a network connected computer or device (e.g., the computer or device making the search request to the query engine 126 or another computer or device, as applicable).

In operation, the collector 118, continuously, intermittently, on demand, upon receipt of a search request by the query engine 126, or otherwise as applicable, detects articles 110 having one or more topical item and which are accessible through communications over the network 102 from source devices 112. As articles 110 are detected by the collector 118, the indexer 120 designates a unique identifier for each article 110 (for example, a number or numbers, letter or letters, other identifiers, metatag or tags, or combinations, as desired in the embodiment). The indexer 120 also stores in the database 106 (or other storage) the identifier and additional indicia of the article 110, for example, any of a topical item, title, source or publisher, publication time, author, summary, tag(s), image list, revision time, other label or element representing the article, or combination.

Upon receipt of a search request by the query engine 126 (such as from a network connected computer or device of a user), the query engine 126 searches the database 102 for articles 110 then indexed and identifies any items of the articles 110 related to the search request. The relatedness can be measured by similarity measures such as keyword matching, Boolean expressions, natural language processing, semantic processing such as latent semantic analysis, document clustering techniques, other statistical or probabilistic measures, or others, such as by comparison of source information, publication or other temporal measures, popularity measures, relatedness to some proxy information, or otherwise. For each indexed item (representing an article 110) of the database 102, the query engine 126 compares the item to a threshold to determine whether the relatedness or relevance level is sufficient for inclusion in a result set. Examples of possible thresholds criteria may include analysis of an associated URL, internet web address, source location, or other portion, link, text, image, or content of an article 110 or corresponding to the article 110. The query engine 126 then compiles the result set of sufficiently related/relevant items (representing articles 110) of the database 102 for the activity detector 122.

The activity detector 122, based on the result set from the query engine 126 and for each item (i.e., representing an article 110), communicatively determines from one or more social/online network sources (and/or other source) an applicable share count for the article 110 and the network source. The share count may be collected by the social/online network source to represent a number of times that the particular article 110 has been "shared", "liked", "commented", "posted", or as otherwise named. In any event, the share count is a measure from a source that collects data representing interactions (such as by users of the source or source network) with the article 110. This share count of user interaction with the article is collected by the activity detector 122 as an indicator of interest in the particular article 110, as well as the various interactions that may be apply for the article 110.

The activity detector 122 makes available to the reporter 124 the share counts collected for each article 110 of the result set from the query engine 126. The reporter 124, based on the share counts and articles 110, then determines the Resonance score for the particular search request. The reporter 124 compiles and formats the Resonance score (and, if applicable other scores or measures), and histories of share counts, Resonance scores, and other items, together in a report template. The report template is accessible from the reporter 124, for example, the reporter 124 delivers the report template through communications over the network 102 to the user computer or device making the search request. A website of or communicatively connected to the monitor processing device 104 can provide a browser display of a web page to user computers/devices via the network 102, for making search requests and receiving report templates of Resonance scores by the computers/devices.

The Resonance score produced by the monitor processing device 104 represents a measure of awareness or interest in a particular topic. In particular, the search request that is input to the monitor processing device 104 by a user computer/device will have or include one or more topical item. The monitor processing device 104, by collecting and analyzing interactivity with articles relevant to the search request, can provide the Resonance score as an indication of interest or awareness of the relevant topical item. This Resonance score, which may include and account for weightings or biases, such as article age, article source, article similarity to the search request, time elapsed since the share/like/comment was applied to the article (or time elapsed relative to the article's publication), value of the social/online network providing the share count for the article, and other factors, is proxy for the topic of the query and its interest among those interacting with the topic.

As an example of the operation, a search request that includes a technical product press release may have a semantically related content, publication, or other reference for, included in or to an article that has been indexed by the monitor processing device 104 from a technology blog. The related article may have some small number of share and like counts on several social/online networks but have many shares on a more professionally oriented social/online network (such as LinkedIn™) where the business of the technology product considers that network's demographics more valuable than other social/online networks. The monitor processing device 104 collects all share counts and determines, including any weighting bias or benchmark more influential, the Resonance score. The user of the requesting computer or device receives the Resonance score as a proxy of interest level, representing the overall awareness to the topic or idea, based on analysis by the monitor processing device 104 of interactions on social/online networks and other sources.

Figure 3:
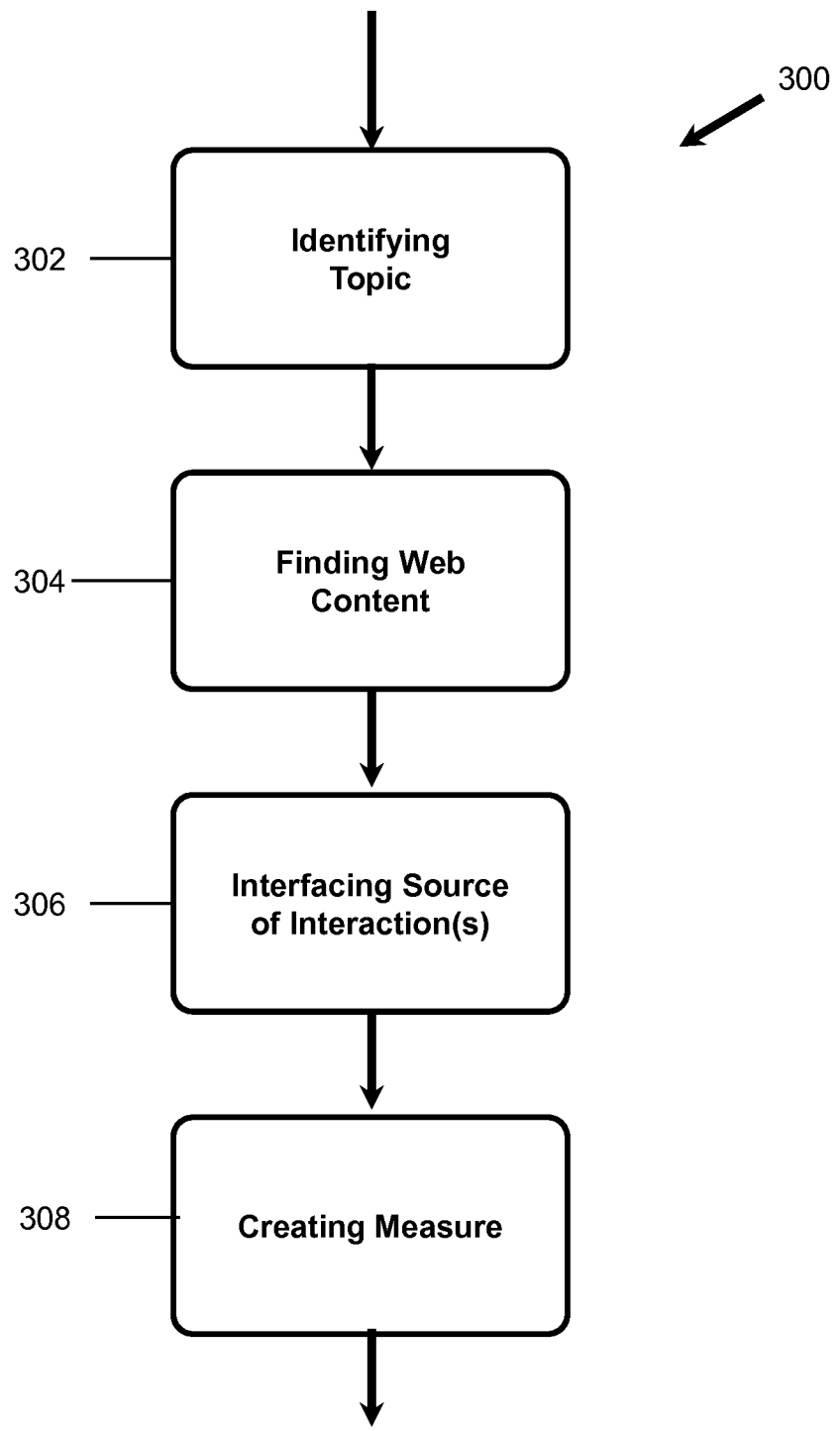
FIG. 3 illustrates a method for monitoring topical activity of communications devices, via communications over a network, according to certain embodiments of the invention.

Referring to FIG. 3, a method 300 of monitoring topical activity of communications devices communicatively connected to a communications network includes identifying 302 a topic to measure (idea, word, query, article, post, shared content, ad, etc). For example, the step of identifying 302 may include monitoring a publication of an article, an access to an article by a communications device, or a characteristic of a communications network or network connected device(s).

On identifying a topic to measure, a step of finding web content (news articles, blog posts, tweets, etc) 304 searches and determines articles and/or other information relevant, similar to or having relationship with the topic. In the step 304, searching is conducted according to a search method (including but not limited to set-theoretic models including Boolean, semantic and keyword, algebraic models such as vector space models, and probabilistic models such as Bayesian, etc.) to determine relevant articles and information for the topic. For example, searching of items, interactions, device or user identifiers, articles, posts, and other interactive elements of a website, network, social network, total Internet, or other set or subset of interconnected communications devices (and, consequently, users of the devices) obtains one or more collection of articles and information for the topic.

For each article or information of the one or more collection, a step of interfacing 306 accesses sources of and devices (and, consequently, device users) interacting with the one or more collection of articles and information for the topic. By the step of interfacing 306, detections of interactions are made, for example, interactions of get, share, comment, like, post (etc) are detected and accumulated. As an example, by interfacing 306 to social networks or other content sharing networks of communicating devices, counts and other metrics are determinable for a wide variety of interactions within and between the devices (and, therefore, users of devices) of the social networks or other content sharing networks as to the topic based on aggregation for the collection of articles and information.

In a step of creating 308 a topic awareness measure, metrics and analyses are performed on the aggregate of counts and other metrics for the collection of articles and information relative to the topic. The step 308 includes, for example, processing and creating individual (per content/article piece) and summary (all matching pieces) indications as gauge of topic awareness. These indications as gauge of topic awareness can be further analyzed, displayed, reported and otherwise manipulated and handled.

In other aspects of the embodiments, a variety of devices and processes can be employed as the elements, components and steps to fetch counts and metrics, interface, access, monitor, and measure, as may be required for particular networks, devices, articles and topics in any application. The embodiments can be combined with other elements and processes, as well. For example, articles published, searched, detected and monitored may be centrally stored or otherwise organized.

Figure 4:
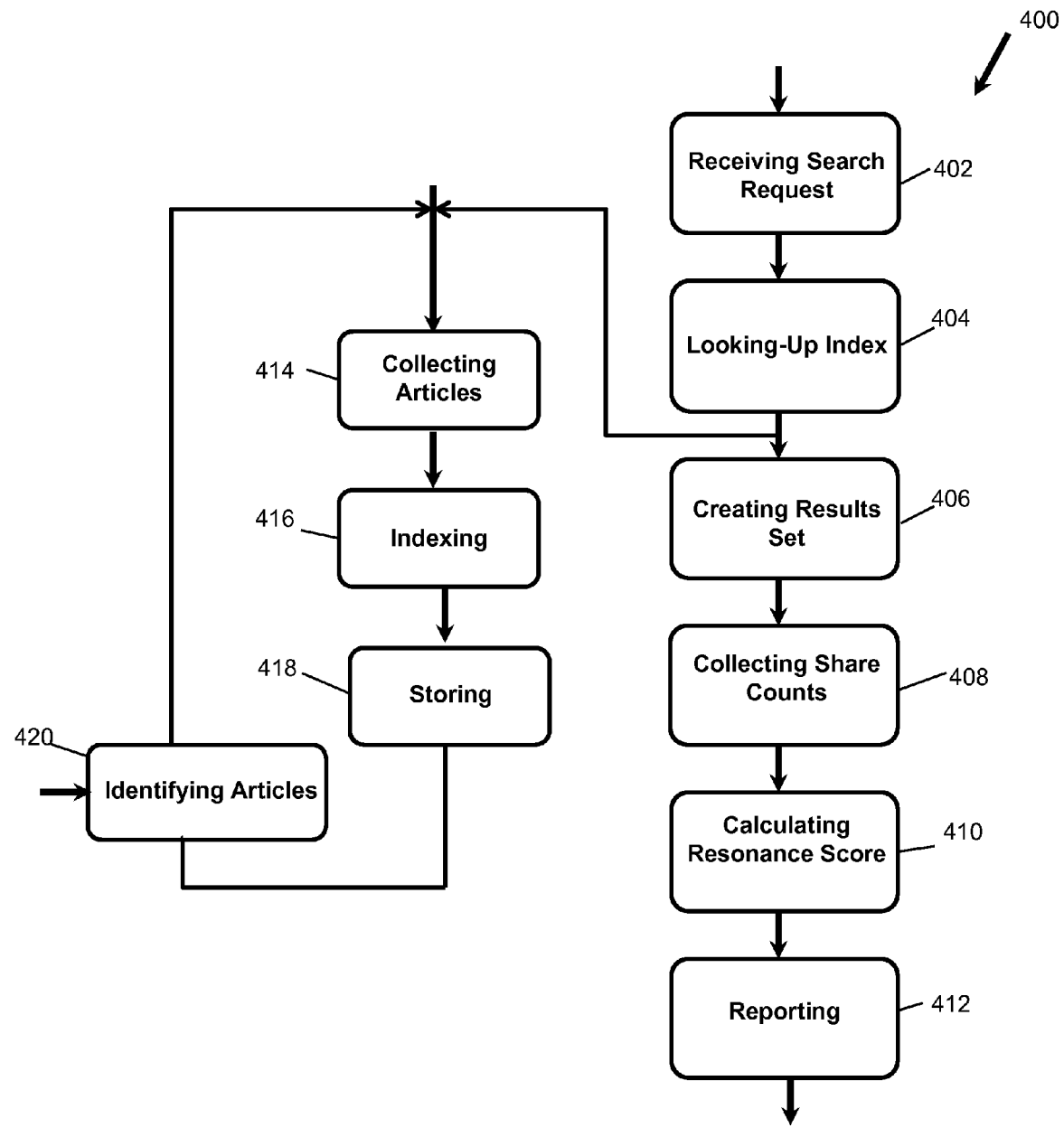
FIG. 4 illustrates a method for monitoring topical interest represented by articles accessible via network communications, based on interactions by devices with the articles, according to certain embodiments of the invention.

Referring to FIG. 4, a method 400 of monitoring topical activity represented by articles (which may be or include a representation of or link to the article(s)) accessible in a communications network, based on interactions with the one or more article by communications devices via communications over the network, includes receiving 402 from the network a search request from a device communicatively connected to the network. Each article (which may include, but is not limited to, a documents, advertisement, software program, social media text or post, image, other information content, or other items), has one or more subject, categorization or other topic, and may be accessed over the network from a host device, such as a website, server, or other device communicatively connected to the network. The search request may be or include any word, text, paragraph, article, title, source, time since publication, publication date, hyperlink to article or link for article, website identifier or locator (e.g., URL), portion or combination of these, or other data items. In certain nonexclusive examples, a website program stored in non-transient memory and processed by a processor serves a web page over the network to the device providing the search request, the search request is input to a search template web page by the device, and the search request is received from communication by the web page over the network in the step of receiving 402.

In a step of looking-up 404, the search request is compared to an index of articles stored in a database or other tangible medium of storage. The comparison in the step of looking-up 404 measures relevancy of the indexed data of the storage representing the articles to the search request. Possible relevancy measures include one or more of a semantic measure in which statistical processing determines a similarity of words of the input to the indicia of articles (e.g., word or keyword match(es)), a document clustering technique, Boolean expression comparison, a natural language process, a latent semantic analysis, statistical and probabilistic comparisons, source comparisons, comparisons of publication or other temporal aspects, popularity or rating measures of others (e.g., starred or preferred selections), financial or proxy information relativity, and others.

In a step of creating 406, a result set is compiled of articles from the step of looking-up 404. In the step 406, articles having relevance to the search request, as determined in the step of looking-up 404, are measured against a threshold (such as a programmed level, an input variable measure, or other). Articles meeting the threshold are compiled in the step of creating 406, such as by compiling the indexed articles, together with a respective unique identifier for each such article indexed in the storage, into the result set.

For each article of or represented in the result set, one or more share count is collected in a step 408. Each share count represents an interactive measure recorded by a count device or system connected to the network, which count device or system is communicatively accessible over the network to obtain the share count. The interactive measure represents the number or extent of device interactions by other devices (i.e., user devices) communicatively connected to the network, with or in respect of the article. A particular, but not exclusive, example of such count device or system is a network-connected server or other communicative device of a social/online network provider, such as Facebook™, Google+™, LinkedIn™, Digg™, Pinterest™, Delicious™ Reddit™, and others), which server or device is accessible over the network to obtain share counts. In general, social/online network provider makes available for access over the network one or more server having a programmed interface or query system. In the step 408, the count device or system is communicatively accessed over the network, such as via the programmed interface, query system or other API (e.g., a web page or link. A particular query is communicated over the network to the count device or system, such as via the applicable API, and the count device or system responds over the network by communicating the share count. In addition to the share count responsive to the particular query, other data set of information may be communicated by the count device or system. If the share count is as subset of a larger data set of information, the step 408 includes parse of the larger data set to obtain the share count.

The share count is collected in the step 408 for each article of or represented by the result set, and from each count device or system accessed in such manner. One or any number or type of count device or system may be accessed in the step of collecting 408 (e.g., according to desired arrangement), where each count device or system makes available for collection a respective share count in the step 408. As examples of the share count in certain embodiments, the share count represents the number of user devices of a social/online network or similar computer or communication network that have shared, posted, liked, voted on, or otherwise interacted with an article or in respect of particular URL(s) of a web page or pages of the article accessible over the network. However, the share count can represent any of a wide variety of types of social network interaction measures of a social/online network, and these may be similarly or differently named by each respective social/online network (e.g., one such network may refer to a measured interaction as "liked", and referred to by another such network as "recommended," "rated," "voted on," etc.).

In a step of processing 410, one or more score, for example, Resonance score, is determined from all share counts collected in the step 408. In the case of a Resonance score, the score represents a level of "awareness" for the particular topic of the search request, because represents the volume of articles and corresponding share counts for those articles for the search request. A higher Resonance score (e.g., a relatively high volume of articles and high share counts for those articles) can indicate a higher interest or awareness of the topic of the search request, and a lower Resonance score (e.g., a relatively lower volume of articles and lower share counts for those articles) can indicate a lower interest or awareness of the topic of the search request.

The score is processed in the step 410 based on all share counts collected in the step 408 for the articles represented by the result set from the step of creating 406. The processing 410 may also include measures of bias or weighting, such as programmed or designated benchmark measures, to obtain the score. A nonexclusive example of the processing 410 calculates a weighted average result, in which, for each particular article of the result set, the respective share count collected in the step 408 from each count device or system is multiplied by an applicable benchmark measure (e.g., a weighted measure) for the share count (or relevant article or relevant count device or system, as applicable); the results of the multiplication for each share count are summed; and the resulting sum is divided by the total number of all share counts for all articles 110 of the result set. The weighted average result (having a percentage value) may, in certain embodiments, be mapped in the step of processing 410 to a scale, for example, of 1-100, as the score.

The benchmark measure for each article and/or respective share counts for the article can be related to the degree or extent of relevance or similarity of the article and/or its share counts to the subject of the search request of the step of receiving 402. Alternately or additionally, benchmark measures (or respective ones of them) can be or include weightings or other indicators of article source, relative age or date of publication or the like, overall share count in general (e.g., log(x) value of totals), and/or other intrinsic or temporal factors or aspects of the respective article(s), the search request at issue, or others. In addition to or in the alternative, as applicable in the embodiment, other scores or measures for the search request may be determined from the share counts in the step of processing 410.

A step of reporting 412 compiles and formats a report template including or representing the score (and, if applicable other scores or measures). The report template can additionally include other items, such as items representing history of share counts, scores, and others, but need not necessarily do so. The report template (or an artifact representing the template) is communicated over the network or otherwise made available to the device communicating the search request. In certain nonexclusive examples of the step of reporting 412, the report template is communicated over the network to the device of the search request from a website, download site or link, data service or otherwise, such as, for example, a website display is communicated over the network to the device and represented in a browser of the device.

Articles are collected for indexing in a step 414. In the step 414, articles accessible via communications over the network are collected. Collecting 414 can include communicatively accessing the article, a link or location of the article, a summary of the article, or another digital item representing the article, from a source device connected to the network having, storing or communicatively connected to the article or the digital item, or otherwise capturing, viewing or processing the article or digital item. The step of collecting 414 can continuously, intermittently, on demand, upon receipt of a search request in the step 402, or otherwise as applicable, detect articles having one or more topical item and which are accessible through communications over the network from source devices communicatively connected to the network. For example, upon a first step of receiving 402 as to a particular topical item of the search request, collecting 414 may proceed for articles accessible on the network that are relevant to the particular topical item of the search request, as determined by processing of keyword matching, Boolean expressions, natural language processing, semantic processing such as latent semantic analysis, document clustering, other statistics or probabilities, or others, and, thereafter, the step of collecting 414 proceed initiate according to programmed rules, input directive, or otherwise, as applicable in the embodiment.

In certain embodiments, a step of identifying 420 articles for collection in the step of collecting 414 includes processing of rules, for example, fixed, programmed or programmable rules, representing type, subject matter, context, similar features, title, and other items, segments, text, images, source, and other features and aspects of articles can control the step of collecting 414. In addition or in the alternative, an article or articles may be targeted for collection in the step 414 by input to the method 400, such as in the step of identifying 420, or otherwise.

Collected articles of the step 414 are indexed in a step 416. In the step of indexing 416, a respective unique identifier is assigned for each article (for example, a number or numbers, letter or letters, other identifiers, metatag or tags, or combinations, as desired in the embodiment). The article is parsed in the step 414 to obtain metadata representing the article. The metadata representing the article may be, for example, any of a topical item, title, source or publisher, publication time, author, summary, tag(s), image list, revision time, other label or element representing the article, or combination of these.

In a step of storing 418, the unique identifier and metadata representing the article are stored, for example, in a database (such as a relational or other database) or other tangible medium, for comparison in the step of looking up 404 in response to search requests received in the step 402.

Figure 5:
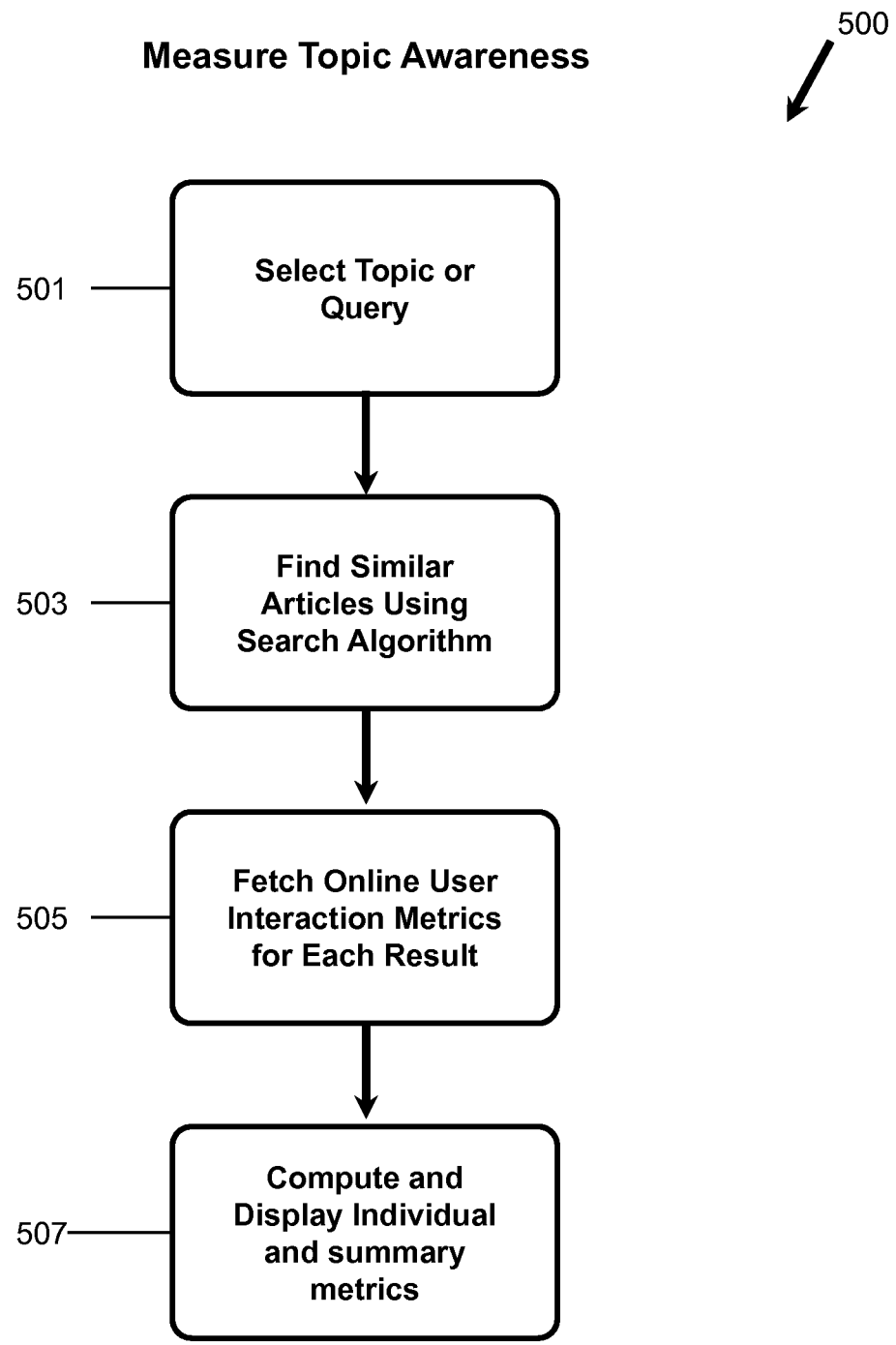
FIG. 5 illustrates an example of a method of measuring awareness or interest in an idea or topic, by detecting device interactivity with an article relevant to the idea or topic, according to certain embodiments of the invention.

Referring to FIG. 5, an example of certain embodiments follows:

500: Example method of measuring awareness of an idea or topic implemented at least in part by one or more computing device 501: An initial topic or query can consist of any text, speech, rich media, or other content or item, for example, including but not limited to a set of key words, part or full document, a web page, data, or other.

503: Web content determined similar to input in [501] by way of search algorithm such as keyword search, statistical or natural language query, vector model, fielded database-style query, or human measured—is identified and selected for processing in [505]. Web content may be a web page or pages containing any text, graphics, or media.

505: For each selected content piece, request and receive usage statistics related to said web content using locally stored or remote resource values. Remote values retrieved from one or many online sources such as Twitter, Facebook, LinkedIn, StumbleUpon, Digg, Delicious, Google Buzz, Google+1, Google Plus, etc. Each remote resource indicating some count of user activity around the content such as shares, likes, comments, posts, etc., each indicative of some awareness of the content.

507: For each content piece, store and display individual and summary measures of counts to indicate the total count or some weighted average of all counts stored and displayed as indication of an overall awareness level about topic of [501]

The embodiments provide a wide variety of applications including for example, the embodiments and results thereof can be used as an indication of trending topics, to determine advertising, to determine most valuable web content for purposes of publication or distribution, as an indicator to help create original content with higher potential, as an indicator into topics for investment purposes, as a way to monitor online awareness around a brand, product, good or service, marketing message, and numerous other possibilities, variations, alternatives, additions and arrangements.

Figure 6:
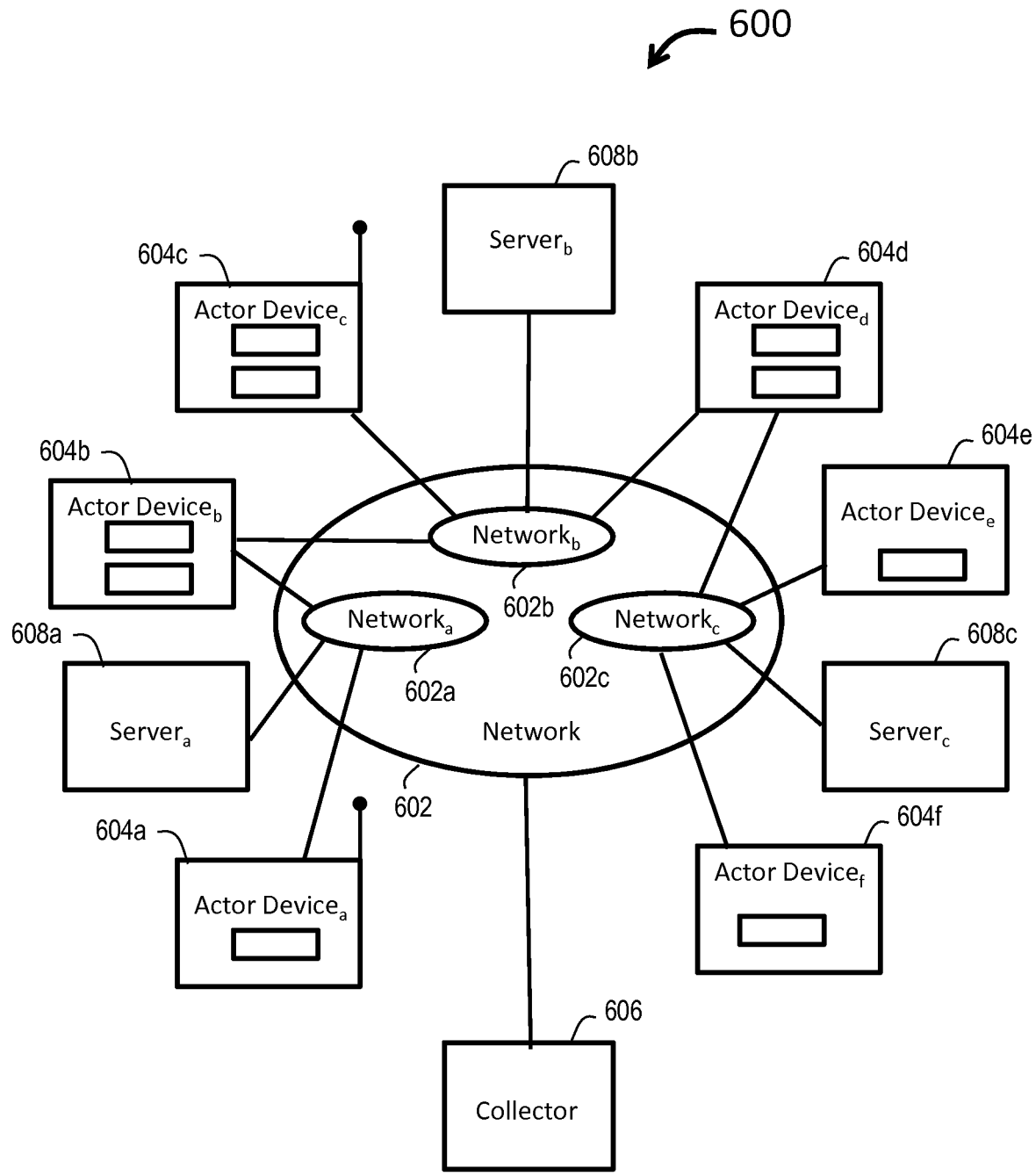
FIG. 6 illustrates a system for collecting respective identities of respective actor devices communicating in a communications network, such as a social communications network, according to certain embodiments of the invention.

Referring to FIG. 6, according to certain embodiments of a system 600, respective actor devices 604a-f communicating in a computer network system 602 are identified by a collector 606. The computer network system 602 includes one or more subset of intercommunicative devices, for example, three subnetworks 602a, 602b and 602c, respectively, for communications of actor devices 604a-b, 604c-d and 604e-f, respectively. More or fewer of the subnetworks 602a-c, and more or fewer actor devices 604a-f of each subnetwork, are possible. The network system 602, and consequently each subnetwork 602a-c, is, for example, a packet-switched network, such as the Internet. In each subnetwork 602a-c, respectively, the corresponding actor devices 604a-f, respectively, communicating in the subnetwork 602a-c, respectively, are identifiable in the subnetwork 602a-c, respectively, such as by a respective user name or handle of each actor device 604a-f, respectively.

Each subnetwork 602a-c, respectively, is controlled by a server 608a-c, respectively. The server 608a, 608b or 608c, as applicable for the subnetwork 602a, 602b or 602c, respectively, may be or include one or more computing device capable of mediating communications among applicable actor devices 604a-b, 604c-d, 604e-f, respectively. For example, the server 602a mediates communications of actor devices 604a-b of subnetwork 602a, the server 602b mediates communications of actor devices 604c-d of subnetwork 602b, and the server 602c mediates communications of the actor devices 604e-f of subnetwork 602c. As will be understood, although each subnetwork 602a-c is illustrated as a distinct subset of the network system 602, communications may follow disparate paths (i.e., packet-switched paths) in the network system 602. The illustrated subsets of subnetworks are, therefore, merely aids for description and should not be interpreted as necessarily distinct from the network system 602, although one or more subnetwork could be distinct from other subnetwork(s).

Each subnetwork 602a-c, respectively, is a restricted-access network controlled by the server 608a-c, respectively. In each respective subnetwork 602a, 602b and 602c, the server 608a, 608b and 608c, respectively, limits and/or permits access by applicable actor devices 604a-b, 604c-d and 604e-f, respectively. For example, the server 608a permits communications by actor devices 604a-b, the server 608b permits communications by actor devices 604c-d, and the server 608c permits communications by actor devices 604e-f. The server 608a-c, respectively, of each such subnetwork 602a-c, respectively, may require registration and use of a user name, password and/or similar key for any actor devices 604a-f communicatively connected to the subnetwork 602a-c. Each actor device 604a-f is a wired or wireless communications device, for example, any of a data-enabled cell phone, laptop computer, tablet, desktop computer, or other communications device. The actor device 604a-f, respectively, has communicative elements and capability to communicate over the network system 602.

In a non-exclusive example, the subnetworks 602a-c, respectively, are each social networks of communications among respective actor devices 608a-f. The server 608a, 608b, and 608c, respectively, executes computer instructions (e.g., social network computer program code) stored in non-transitory media of or communicatively connected to the server 608a, 608b or 608c, to perform functions of a social network service. The servers 608a-c, subnetworks 602a-c and actor devices 608a-f are exemplary, and more or fewer numbers and types are possible. Examples of the subnetworks 602a-c include any of Facebook™, Twitter™, or other social or communicative network. Although a social network is one example, each subnetwork 602a-c may be any other communications network of one or pluralities of respective actor communications devices.

The collector 606 includes one or more processing device 610 and one or more data storage 612. The collector 606 executes computer instructions (e.g., program code) stored in the data storage 612, and/or includes circuits, to communicate with each server 608a-c, respectively. Each server 608a-c includes one or more respective interface device (not shown in detail in FIG. 6), respectively. A non-exclusive example of the interface device, respectively, is an application programming interface (API) stored in memory and processed by the corresponding server 608a-c, respectively, of each subnetwork 602a-c, respectively. The collector 606 communicatively accesses the server 608a, 608b and 608c, respectively, to determine identities (e.g., user name or handle) of each actor device 604a-b, 604c-d, and 604e-f, respectively, of the particular subnetwork 602a, 602b, and 602c.

Any actor device 604a-f contributing to communicative activity in the corresponding social network (i.e., the subnetwork 602a, b or c) for the actor device, has a respective actor identifier in the subnetwork of the social network (which actor identifier may represent particular user of the respective actor device). Each actor identifier, thus, represents a corresponding actor device or user of the actor device, communicating in the social network. These respective actor identifiers are known to the respective server of each social network of the network system 602, and are ascertained by the collector 606 from the server of each social network.

In operation, the collector 606, via operations of the processing device 610 based on computer program instructions and/or circuits, communicates with the respective APIs of the servers 608a, b and c of the subnetworks 602a, b and c. The collector 606 communicates to the APIs by specific calls required by the APIs, to request identifiers of each actor device actively communicating in the subnetwork 602a, b and c (e.g., each social network). The collector 606 retrieves the identifiers from each server 608a, b and c. The collector 606 saves the identifiers in storage 612.

Figure 7:
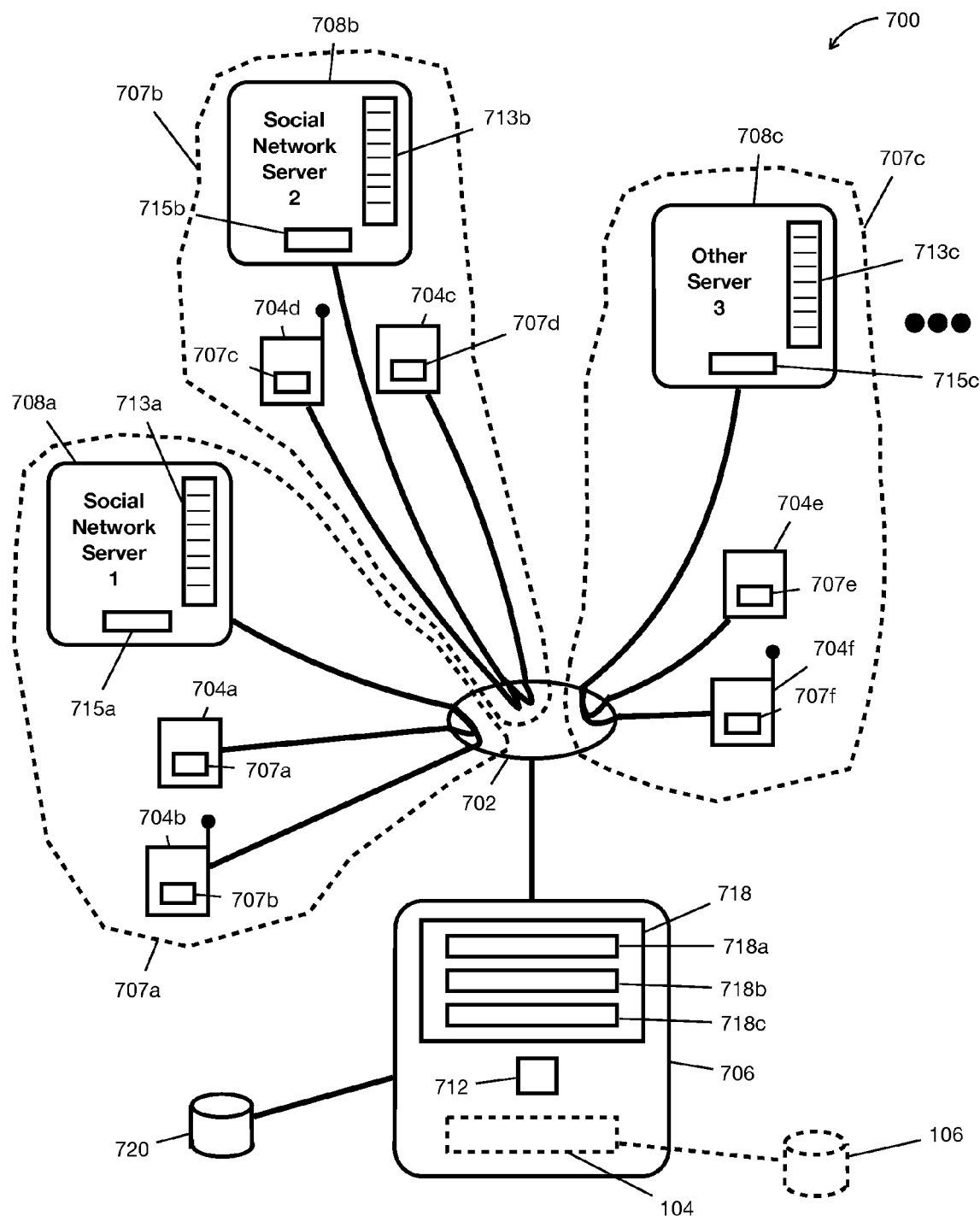
FIG. 7 illustrates a system, including an identifier computer, for determining identities of actor devices in a computer network system of one or more social network, according to certain embodiments of the invention.

Referring to FIG. 7, in conjunction with FIGS. 1-2 and 6, a system 700 for determining identities 705a-f of actor devices 704a-f in a computer network system 702 of one or more social network 707a-c, includes an identifier computer 706, such as, for example, the collector 606 of FIG. 6, communicatively connected to the network system 702. One or more social network server 708a-c is communicatively connected to the network system 702. Each social network server 708a-c maintains in respective memory 713a-c, a user name or handle of each actor device 704a-f (respectively representing such actor device, for example, an identity of the then-user of the actor device) actively accessing the social network server 708a-c, as applicable, via communicating in the network system 602 (i.e., within the subnetwork or social network 707a, b or c, of the corresponding server 708a, b or c). For example in FIG. 7, the actor devices 704a and 704b actively communicate in the network system 602 with the social network server 708a and the memory 713a stores the identity 707a of the actor device 704a and the identity 707b of the actor device 704b; and the actor devices 704c and 704d actively communicate in the network system 602 with the social network server 708b and the memory 713b stores the identity 707c or the actor device 704d and the identity 707d of the actor device 704d; and so forth for each social network server and respective actor devices which communicate therewith.

Each social network server 708a-c, respectively, includes a respective interface device 715a-c. The respective interface device 715a, b or c is, for example, an application programming interface (API) stored in memory and processed by the corresponding social network server 708a, b or c, respectively. Alternately, the interface device 715a-c, respectively, is any of a direct connection (distinct from the network system 602) of any social network server 708a-c, respectively, to the identifier computer 706; or the social network server 708a-c, itself, if the social network server 708a-c, as applicable, includes elements of the identifier computer 706.

The identifier computer 706 includes a communication unit 718 processed by a processor 712. The communication unit 718 is communicatively connected to each interface device 715a-c over the network system 702. The communication unit 718 is, includes or communicatively connects to one or more hardware device, software program stored in memory, or combination of these, communicatively connected to a database 720 or similar storage. The processor 712 is or includes one or more microprocessor, computer, processed software stored in memory, or combination of these. The identifier computer 706 may also include or communicatively connect to memory, such as random access memory or other.

The communication unit 718 includes or communicatively connects to a call device 718a, a receive device 718b, and a data handler 718c. The call device 718a, the receive device 718b and the data handler 718c may be unitary as part of the communication unit 718 or distinct devices of the communication unit 718 or separate devices in communicative connection therewith, in any varied combination. The call device 718a, the receive device 718b and the data handler 718, respectively, each is or includes one or more hardware device, software program stored in memory, or combination of these, respectively, of or communicatively connected to any one or more API of each respective one of the servers 708a-c.

In certain alternatives, the identifier computer 706 includes or communicatively connects to a monitor processing device 104 and database 106 of FIG. 1, or the identifier computer 706 is included in the monitor processing device 104 or the monitor processing device 104 includes the identifier computer 706. In such embodiments, the identifier computer 706, via the communication unit 718, determines from the servers 708a-c, respectively, respective identifiers of actor devices actively communicating in the subnetwork/social network 707a, b or c, of the corresponding server 708a, b or c. For example, identifiers of actor devices whose communicative activity is determined for contribution to a score or measure, such as share counts and the Resonance score as described with respect to FIGS. 1-5, are determined and recorded by the identifier computer 706.

In operation, the identifier computer 706 communicates with the APIs of the servers 708a-c, to retrieve identities 707a-f (i.e., user names or handles) of the actor devices active in communications with the servers 708a-c within the corresponding social networks 707a-c. For each server 708a, b and c, the processor 712, via hardware, software or combinations of the identifier computer 706, directs the communication unit 718 to communicate a respective select call to the API of the server. This select call to the API receives a response from the server that represents the identities of actor devices which are active in communicating in the social network of the server. The actor devices of interest may be, for example, those which, through communicative activity in the social network, contribute to share counts for calculation of the Resonance score, or others. The identifier computer 706 receives the response from the server based on the select call. The identifier computer 706 then stores the identities in the database 720 according to relevant criteria of actor device communication timing, topical activity, and/or others.

Figure 8:
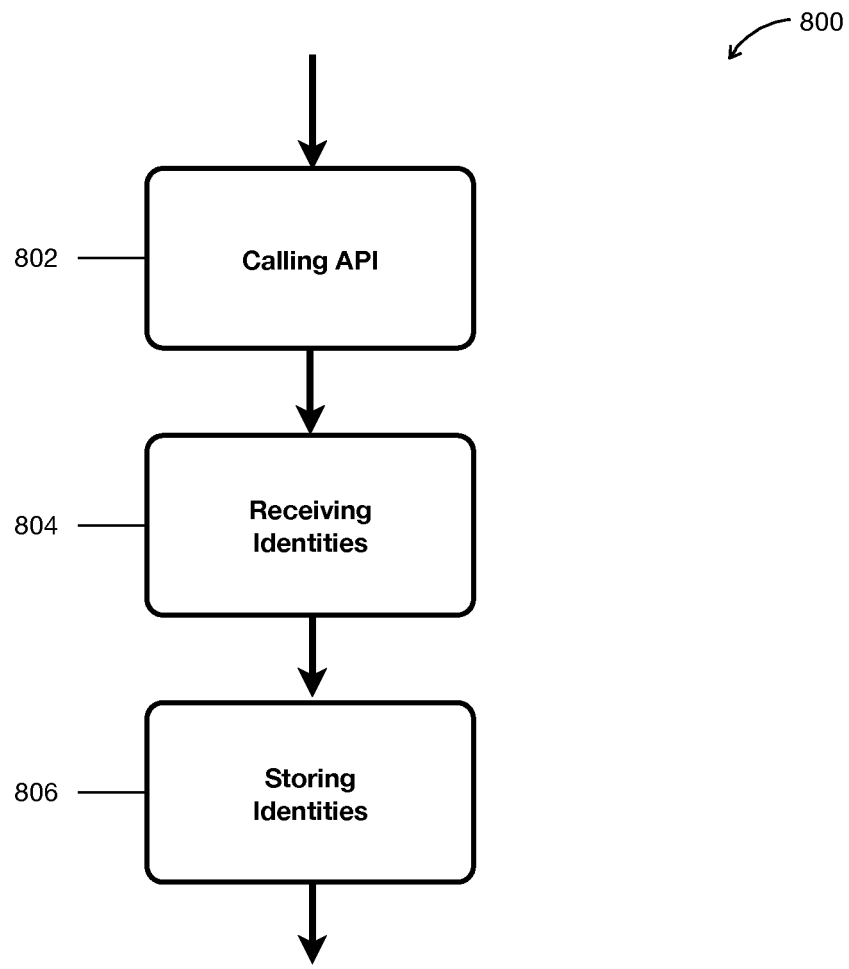
FIG. 8 illustrates a method of collecting identities of actor devices in social networks, according to certain embodiments of the invention.

Referring to FIG. 8, a method 800 of collecting identities of actor devices in social networks includes a step 802 of calling a social network server by a select call to an API of the server. The select call of the step 802 corresponds to the API and represents a request for identities of actor devices selectively communicating in the social network. A step of receiving identities 804 retrieves identity (e.g., user name or handle) of each actor device selectively communicating in the social network. In the step 804, the identities 804 are unique to the social network and represent each of the particular actor devices selectively communicating in the network. The select communications targeted for actor devices may include, for example, communications related to a particular topic or item of which the actor devices perform relevant communications in the network. In a step 806, the identifiers from the step of receiving identities 804 are stored in a database or other storage.

Figure 9:
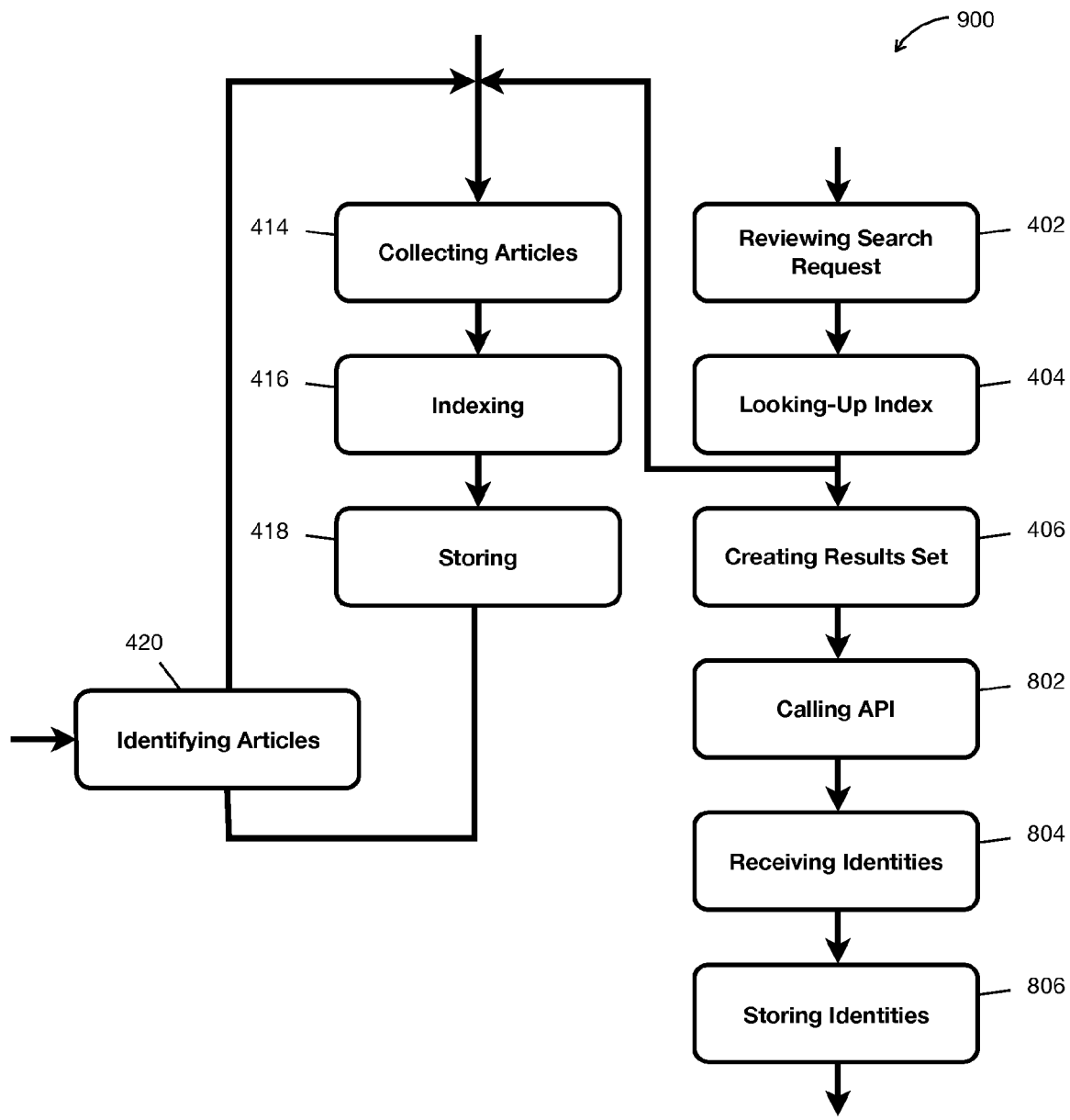
FIG. 9 illustrates a method of collecting identities of actor devices communicating regarding articles which are collected, indexed and identified, according to certain embodiments of the invention.

Referring to FIG. 9, a method 900 of collecting identities of actor devices includes the steps 402, 404, 406, 414, 416, 418, and 420 of FIG. 4, in which articles are collected, indexed and identified, and result sets for actor device interactions corresponding to the articles are obtained. From the result sets created in the step 406, the steps 802, 804, and 806 are performed by an identifier computer to call each social network of the result set and obtain and store identities of actor devices of the social networks which have interaction (e.g., specific communications in the social network) with the topic of articles.

Figure 10:
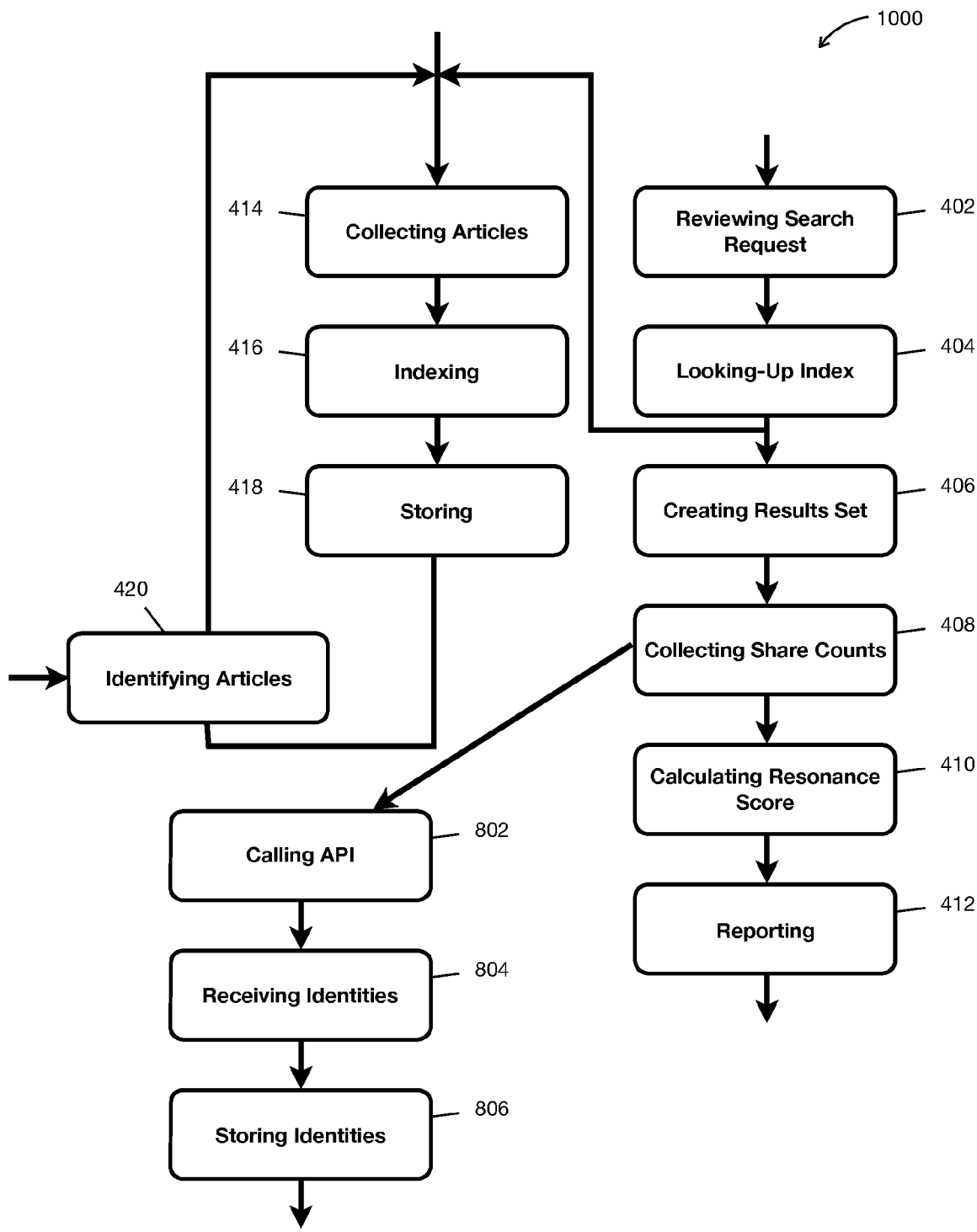
FIG. 10 illustrates a method of monitoring topical activity regarding articles in a social network and collecting identities of actor devices contributing to communicative activity regarding the articles, according to certain embodiments of the invention.

Referring to FIG. 10, a method 1000 of monitoring topical activity represented by communicative activity regarding articles in a social network and collecting identities of actor devices in the social network contributing communicative activity, includes the steps 402, 404, 406, 408, 410, 412, 414, 416, 418 and 420 described above with respect to FIG. 4, and also the steps 802, 804, and 806 described above with respect to FIGS. 8 and 9. In the method 1000, requests received by the social network server in the step 402 are looked up in an index in the step 404. Articles relevant to the requests are collected, indexed with respect to topic, stored and identified in the steps 414, 416, 418, 420, respectively. Result sets of articles from the step 404 are created in the step 406. Communicative activity of actor devices detected by the social network (via the social network server) is collected in the step 408. The same process is repeated for one or more social networks. Based on the collected share counts of the step 408, the Resonance score is calculated in the step 410 and reported in the step 412.

The method 1000 further includes the step 802 of calling the API of the social network by a select call representing a request for identities of actor devices in the social network contributing communicative activity regarding the article(s) corresponding to the collected share counts. A response to the step 802 is received in the step 804, the response represents the identities of the particular actor devices contributing communicative activity. The identities of the actor devices are stored in the step 806.

According to certain embodiments, identities of actor devices obtained from social or other networks are accessed and employed to target advertising on the networks, to specify groups of identities to send email promotions, and/or for other purposes. Segments or classifications of identities are possible, for example, specific segment or classification may be ordered based on actor communicative activity in respect of articles, items or other interests.

In the foregoing, the invention has been described with reference to specific embodiments. One of ordinary skill in the art will appreciate, however, that various modifications, substitutions, deletions, and additions can be made without departing from the scope of the invention. Accordingly, the specification and figures are to be regarded in an illustrative rather than a restrictive sense, and all such modifications substitutions, deletions, and additions are intended to be included within the scope of the invention. Any benefits, advantages, or solutions to problems that may have been described above with regard to specific embodiments, as well as device(s), connection(s), step(s) and element(s) that may cause any benefit, advantage, or solution to occur or become more pronounced, are not to be construed as a critical, required, or essential feature or element.

What is claimed is:

1. A system for collecting identities of networked devices communicating in a social communications network regarding an article, a server mediates communications in the social communications network, the server includes an application programming interface (API), comprising:
   a processor;
   data storage communicatively connected to the processor;
   a call device communicatively connected to the processor for communicating with the API of the server to request the identities;
   a receive device communicatively connected to the processor for capturing the identities in response to the request; and
   a data handler communicatively connected to the processor and the data storage, for indexing the identities relative to the article in the data storage.

2. The system of claim 1, further comprising:
   a monitor for monitoring topical activity in a search item of a user device, messages including an article artifact representing an article are communicated over a communications network of networked devices, and the communications network counts the messages to yield a share count of the messages for the communications network, including:
   a query receiver communicatively connected to the user device, for communicatively receiving the search item from the user device;
   a database communicatively connected to the query engine, the database contains at least one indexed article representing the article;
   a comparator communicatively connected to the query device and the database for determining any of the at least one indexed article of the database similar to the search item received by the query receiver;
   a detector communicatively connected to the comparator and the communications network, for accessing the communications network to obtain, for each of the at least one indexed article determined by the comparator, the share count of the messages of the communications network including the article artifact representing the indexed article of the article; and
   a score processor connected to the detector, for deriving a score from the share count of the messages, the score represents topical interest in the search item for the communications network.

3. A system for monitoring topical activity in a search item of a user device and collecting an identity of the user device, messages including an article artifact representing an article are communicated over a communications network of networked devices, the communications network counts the messages to yield a share count of the messages for the communications network, a server mediates communications in the communications network, and the user device has a unique identity in the communications network maintained by the server, comprising:
   a query receiver communicatively connected to the user device, for communicatively receiving the search item from the user device;
   a database communicatively connected to the query engine, the database contains at least one indexed article representing the article;
   a comparator communicatively connected to the query device and the database for determining any of the at least one indexed article of the database similar to the search item received by the query receiver;
   a detector communicatively connected to the comparator and the communications network, for accessing the communications network to obtain, for each of the at least one indexed article determined by the comparator, the share count of the messages of the communications network including the article artifact representing the indexed article of the article;
   a score processor communicatively connected to the detector, for deriving a score from the share count of the messages, the score represents topical interest in the search item for the communications network;
   a processor communicatively connected to the comparator for receiving an indicator that at least one indexed article of the database is similar to the search item;
   data storage communicatively connected to the processor;

a call device communicatively connected to the processor for communicating with the API of the server to request the identity of the user device from the server;

a receive device communicatively connected to the processor for capturing the identity of the user device returned by the server; and a data handler communicatively connected to the processor and the data storage, for indexing the identity relative to the search item in the data storage.

* * * * *